United States Patent [19]
Lee

[11] Patent Number: 5,823,724
[45] Date of Patent: Oct. 20, 1998

[54] END CAPS FOR TIE-DOWN TRACK AND PROCESS FOR INSTALLING A TIE-DOWN TRACK

[75] Inventor: Ray Lee, Los Angeles, Calif.

[73] Assignee: New Haven Moving Equipment Corp. of California, Inc., Los Angeles, Calif.

[21] Appl. No.: 687,714

[22] Filed: Jul. 29, 1996

[51] Int. Cl.[6] .................................................. B60P 7/08
[52] U.S. Cl. .............................. 410/104; 410/8; 410/105; 410/112
[58] Field of Search ............................... 410/8, 101, 104, 410/105; 248/499; 24/265 CD, 68 CD; 224/326

[56] References Cited

U.S. PATENT DOCUMENTS

| | | |
|---|---|---|
| 3,452,958 | 7/1969 | Hambleton ........................ 410/105 X |
| 3,622,114 | 11/1971 | McIntire, Jr. ....................... 410/105 X |
| 4,500,020 | 2/1985 | Rasor .................................. 410/104 X |
| 4,688,843 | 8/1987 | Hall .................................... 410/105 X |
| 4,768,691 | 9/1988 | Stapleton ............................ 224/326 X |
| 4,890,777 | 1/1990 | Bott ........................................ 224/326 |
| 5,609,452 | 3/1997 | Looker et al. .......................... 410/105 |

Primary Examiner—Stephen T. Gordon
Attorney, Agent, or Firm—Edgar W. Averill, Jr.

[57] ABSTRACT

End caps for insertion into the ends of a tie-down track of the type used to secure cargo, wheelchairs and the like typically to the floor of a vehicle. The end caps are curved and permit the easy insertion of an assembly of the tie-down track and end caps into a routed groove in the floor. Preferably the end caps and the tie-down track have a beveled flange so that the resulting installed track has a smooth transition from the floor surface to the track surface. With the end caps of the present invention, there is no need to square off the ends of a routed groove.

10 Claims, 3 Drawing Sheets

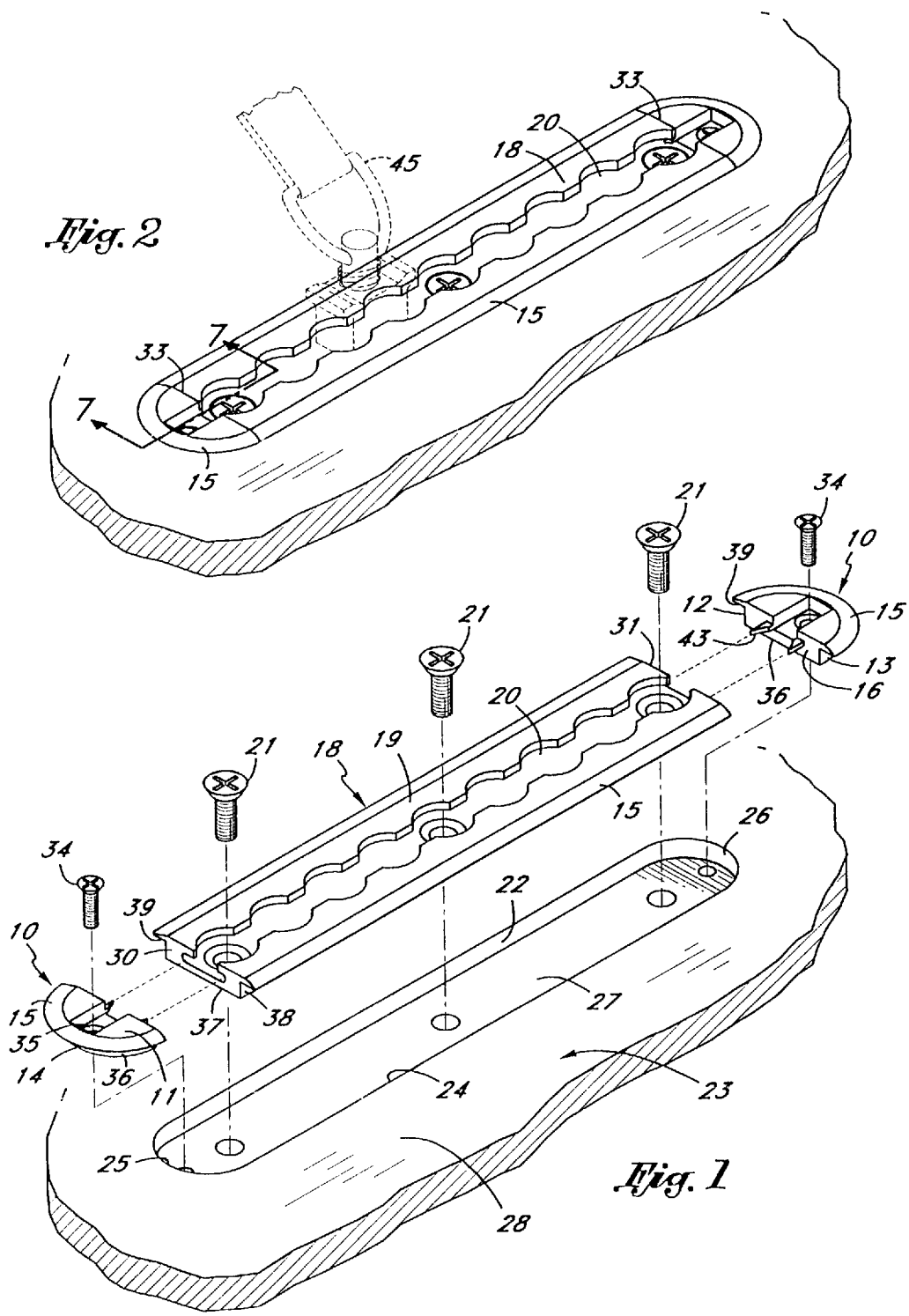

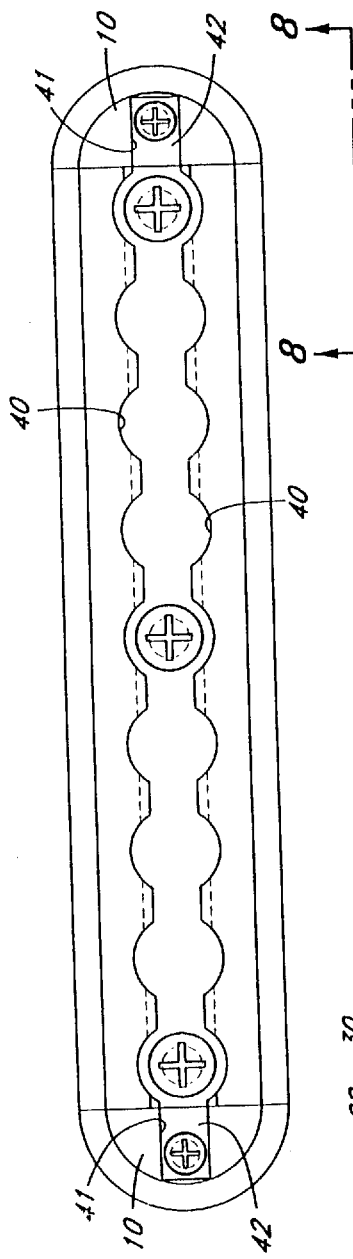
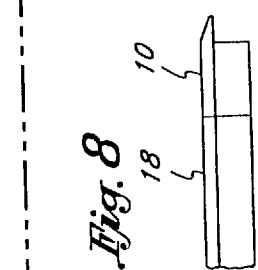
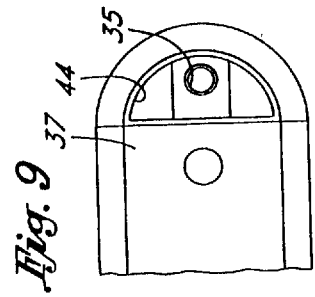
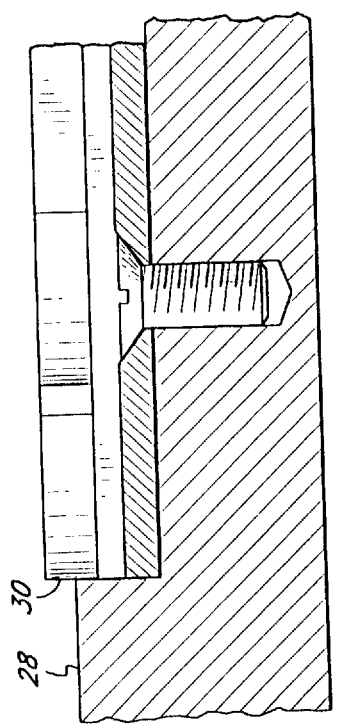
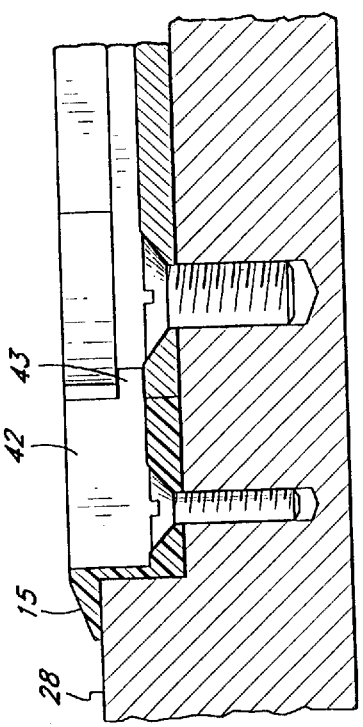

END CAPS FOR TIE-DOWN TRACK AND PROCESS FOR INSTALLING A TIE-DOWN TRACK

BACKGROUND OF THE INVENTION

The field of the invention is cargo tie-down tracks and the invention relates more particularly to the installation of a tie-down track in a floor or wall surface such as the floor of a motor vehicle. Tie-down tracks have been widely used to secure cargo, fixtures such as seats and other materials to the floor of some sort of transporting vehicle, such as an airplane, train or truck. Such tie-down track has also become widely used to secure wheelchairs to the floor of a bus or other motor vehicle. The installation of such tie-down tracks is typically performed by routing a groove in a plywood floor of the vehicle. Next, the curved end walls of the groove resulting from the cutting of the router are squared off with a chisel and a rectangular length of tie-down track is inserted into the groove and screwed into place. This approach has several disadvantages. First, it is necessary to square off the ends of the routed groove which is a tedious process. Secondly, the ends of the track often extend above the floor surface even though the sides of the track may be beveled.

Numerous tie-down track assemblies are known in the prior art. A pallet having a peripheral tie-down track is shown in U.S. Pat. No. 3,622,114. This patent shows a common style of tie-down track, particularly useful with the end caps of the present invention.

U.S. Pat. No. 4,500,020 shows an end cap in FIG. 4 for a cargo carrier for a motor vehicle and U.S. Pat. No. 4,890,777 also shows an end cap for a motor vehicle cargo carrier. None of these patents suggest any procedure which will facilitate the securement of a tie-down track in the floor of a motor vehicle or other location.

BRIEF SUMMARY OF THE INVENTION

It is an object of the present invention to provide tie-down end caps which may be used with a length of conventional tie-down track to facilitate the installation of a tie-down track in a floor and to provide a tie-down track which has a smooth transition from its top to the floor surface.

The present invention is for an end cap for insertion into the end of a length of tie-down track which is at least partially embedded into a floor. The tie-down track has a flat base, two external walls, two end walls, the track top surface with an elongated undercut opening for affixment of a cargo track fitting. The length of tie-down track has a rectangular shaped profile when viewed from the top and has two end walls. A cap member is preferably inserted into each end wall. The track member has a track abutting face and a back, a cap top surface and a cap bottom surface. When the track abutting face is mated against one of the two ends of the tie-down track, the top of the cap member matches the top of the tie-down track. The cap member has two external walls which are curved at the back of the cap member to form a semi-circular portion which fits smoothly in the semi-circular groove cut in a floor. Indexing means are provided to align the cap member with the ends of the length of tie-down track. Preferably the tie-down track and cap member have beveled flanges. The indexing means is preferably a pair of fingers extending into the elongated undercut opening of the tie-down track. The end cap preferably has an opening in the top which matches the elongated opening in the tie-down track. It also preferably has a fastener opening for securement of the end cap to the floor.

The present invention is also for a process for installing the length of tie-down track in a wooden floor which has a floor surface. The process comprises the steps of routing a groove in the floor surface where the tie-down track is to be installed. The elongated groove has semi-circular ends caused by the router and has a straight length. A length of tie-down track is cut equal to the length of the straight portion of the groove. Next, the end caps are inserted into the ends of the length of tie-down track and the end caps have a semi-circular end wall which mate with the semi-circular ends of the straight groove. Next, the tie-down track and end caps are inserted into the straight groove and secured thereto.

BRIEF DESCRIPTION OF THE DRAWINGS

FIG. 1 is a perspective view of the end caps of the present invention together with a conventional length of tie-down track shown over a groove cut in the floor into which the track is to be installed.

FIG. 2 is a perspective view showing the top of the assembly of FIG. 1 in an installed configuration.

FIG. 5 is a cross-sectional view taken along line 5—5 of FIG. 4 showing a prior art installation.

FIG. 6 is a top view of the end caps of the present invention installed on a length of tie-down track.

FIG. 7 is a cross-sectional view taken along line 7—7 of FIG. 2.

FIG. 8 is a side view taken along line 8—8 of FIG. 6 showing the end cap of the present invention affixed to the end of a length of tie-down track.

FIG. 9 is a bottom view of the end cap and tie-down track of FIG. 8.

DESCRIPTION OF THE PREFERRED EMBODIMENTS

Figures 3, 4:
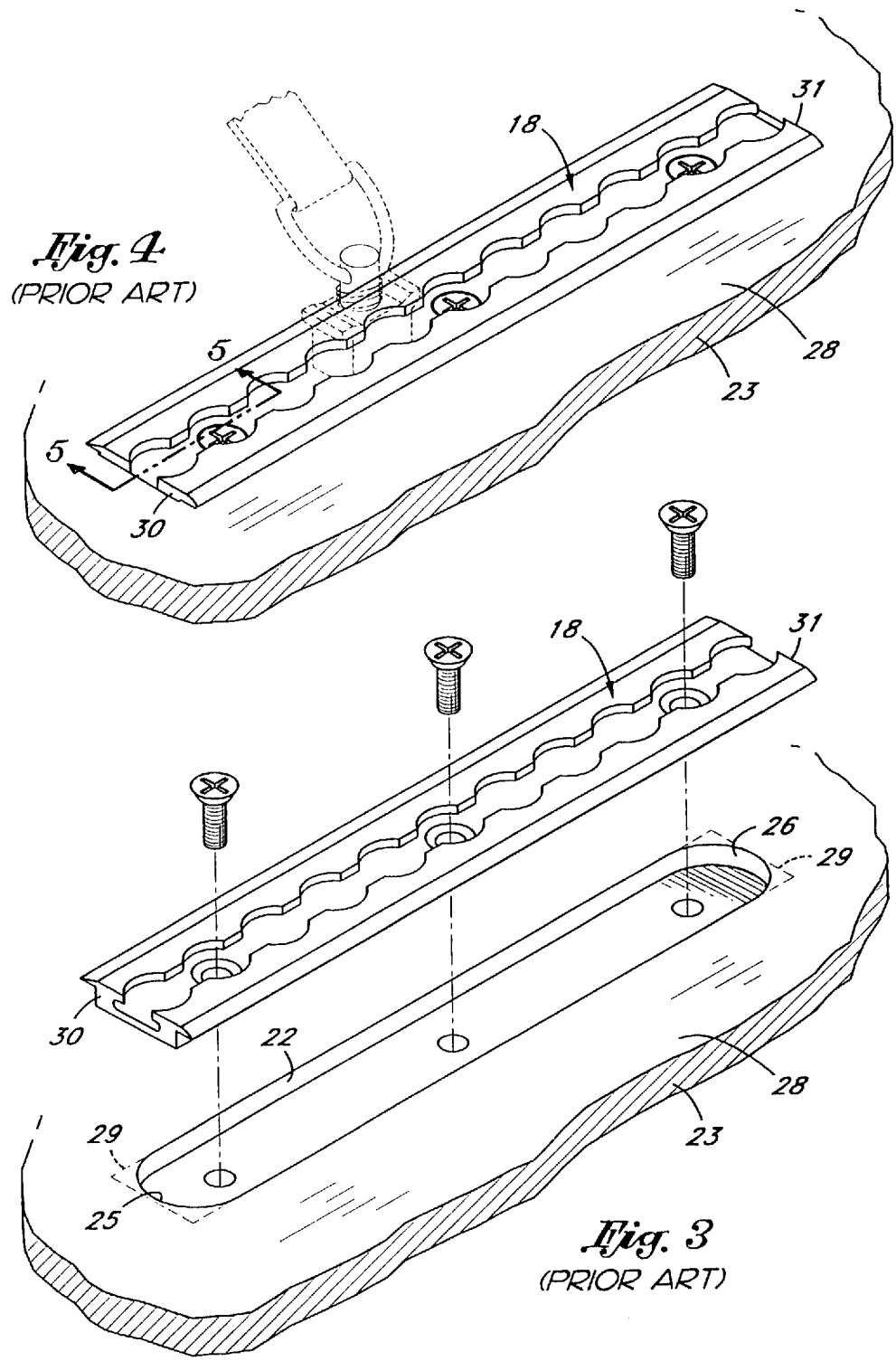
FIG. 3 is an exploded perspective view of a prior art tie-down track and routed groove in a floor surface.
FIG. 4 is a perspective view showing the prior art installation of the track of FIG. 3.

Two end caps 10 are shown in perspective view in FIG. 1. The end caps 10 each have a cap top surface 11 and external walls 12 and 13 which extend into a curved semi-circular shape at back 14. The end caps 10 shown in FIG. 1 have a beveled flange 15. Each end cap has a track abutting face 16 which matches the external walls 30 and 31 of a length of tie-down track 18. The length of tie-down track 18 is conventional and has a top surface 19 with an elongated undercut opening 20 into which various track fittings may be secured. Screws 21 secure the length of tie-down track 18 to a groove 22 formed in floor 23. Groove 22 has a straight length 24 and two semi-circular ends 25 and 26. Groove 22 also has a flat floor 27. Groove 22 is formed using a conventional router which has a cylindrical cutting face. When the router is guided along a floor surface 28 a groove in the shape of groove 22 is formed.

Turning briefly to FIG. 3, the same sort of groove 22 is shown with semi-circular ends 25 and 26. This groove, however, must be chiseled out as shown by the phantom lines 29 so that the rectangular ends 30 and 31 of conventional tie-down track 18 fit against the chiseled rectangular ends of the groove which has been squared off as indicated in FIG. 3. The installed track is shown in FIG. 4 where it can be seen that the ends 30 and 31 extend above the floor surface 28. This could conceivably be a safety hazard and is at the least somewhat unsightly and unfinished appearing.

Turning now to the end caps of the present invention and to FIGS. 1 and 2, it can be seen that end caps 10 fit against the end walls 30 and 31 of tie-down track 18 so that the track abutting face 16 abuts the end walls to form a smooth intersection such as that indicated by reference character 33 in FIG. 2. The exposed end wall 30 can be seen clearly in FIG. 5 to extend above the floor surface 28 in an unsightly and at the very least a place to collect dirt. In contrast, the end cap of the present invention shown in FIG. 7 has a beveled flange 15 which smoothly provides a transition down to the floor surface 28. A screw 34 passes through an opening 35 in end cap 10 and the bottom 36 of the end cap as well as the flat base 37 of the tie-down track abut the flat floor 27 of groove 22. Also, the external walls of the tie-down track 18 and the external walls 12 and 13 of the end caps snugly fit against the edges of groove 22. Tie-down track 18 also has a beveled flange 15 and the beveled flange of the tie-down track and the end caps have an undersurface 39 which is flat and abuts the floor surface 28. Often there will be a floor covering and in this case the depth of groove 22 will be modified to accommodate the floor covering so that the undersurfaces 39 will form a smooth transition with the upper surface of any such floor covering.

As shown best in FIG. 2, a very attractive and safe installation is achieved. The track fittings 45 shown in phantom view in FIGS. 2 and 4 can be conventionally attached into the elongated undercut opening 20 in the length of tie-down track 18.

A top view of the installed track of FIG. 2 is shown in FIG. 6 where it can be seen that the inner edges of undercut opening 20 match with the inner edges 41 of a groove 42 formed in end caps 10. This can facilitate in the removal of track fitting 45.

The end cap 10 may have various attachment means for holding and aligning the end caps to the tie-down track. One such means is shown in FIGS. 1 and 7 where a pair of fingers 43 extend outwardly from the track abutting face 16 of end cap 10. These fingers 43 fit within elongated undercut opening 20 and cause the end caps and the track to be able to be secured together as shown best in FIG. 8 of the drawings. The bottom of end cap 10 is shown in FIG. 9 where a recess 44 is provided to reduce the amount of material required for the end cap.

Since the end caps are not required to provide a structural support function they may be fabricated from a polymer such as ABS. While the end caps of the present invention have been shown in the drawings as being installed in a plywood floor, they, of course, are equally useful in installation in rubber matting or carpeting. While a pair of fingers has been shown to align the end caps with the track, other such alignment means may be used, such as a thin bracket surrounding the walls and floor of the end cap which could be slid over the external walls and flat base of track 18. Also, while a beveled flange is shown, the end caps can be unflanged and still provide the advantage of facilitating the installation of a length of track by eliminating the need of squaring off the ends of a routed groove.

The process for installing a length of tie-down track of the present invention into a wooden floor involves the steps of routing a straight groove in the floor where the tie-down track is to be installed. This straight groove has semi-circular ends and a straight length. Next, a length of tie-down track is cut which equals the straight length of the straight groove and the tie-down track has first and second ends. Next, an end cap is inserted into each of the first and second ends and the tie-down track and end walls are placed into the groove. Next, the end caps and tie-down track are secured to the groove preferably by screws through the bottom of the tie-down track and end caps.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An end cap for insertion into an end of a length of tie down track of the type at least partially embedded in a floor, said tie down track having a flat base, two external walls, two end walls, and a track top surface with an elongated undercut opening to result in a length having a rectangular shaped profile when viewed from the top, each end wall of said length having an external shape as viewed from one of said ends, said end cap comprising:

a floor having an elongated groove formed in a floor surface thereof;

an end cap held in said elongated groove, said end cap having a track abutting face and a back, a cap top surface and a cap bottom surface which, when the track abutting face is mated against one of the end walls of said tie-down track, the cap top surface matches the track top surface and said flat base of the tie-down track to form a smooth transition from the track to the cap, two cap external walls which when the track abutting face is mated against one of said end walls, match the track external walls, said two cap external walls being curved in a semi-circular shape to meet at the back of the cap; and indexing means to align the end cap with one of said two end walls of said tie down track.

2. The end cap of claim 1 wherein the length of tie down track and the end cap each have a matching beveled flange extending outwardly from the external walls of the length of tie down track and the end cap.

3. The end cap of claim 1 wherein said indexing means comprises a pair of fingers extending away from the track abutting face of the end cap and positioned to fit snugly into the elongated undercut opening of said length of tie down track.

4. The end cap of claim 3 wherein said end cap further includes an elongated groove in the cap top surface extending to the track abutting face.

5. The end cap of claim 4 wherein said end cap has a fastener opening extending through a base of said elongated groove to facilitate the attachment of the end cap to a floor.

6. An end cap for insertion into an end of a length of tie down track at least partially embedded in an elongated groove in a floor, said elongated groove having a bottom floor, two side walls and at least one curved end wall and said floor having a floor surface adjacent said elongated groove, said tie down track having a flat base abutting said bottom floor, two track external walls abutting the side walls of the elongated groove, two track end walls, and a track top surface with an elongated undercut opening to result in a length having a rectangular shaped profile when viewed from the top, each track end wall of said length having an external shape as viewed from one of said ends, said end cap comprising:

an end cap having a track abutting face and a back, a cap top surface and a cap bottom surface which, when the track abutting face is mated against one of said two track end walls, the cap top surface matches the track top surface and said flat base of the tie-down track matches the cap bottom surface to form a smooth transition from the track to the cap, two cap external walls which when the track abutting face is mated against one of said end walls, match the track external walls, said two cap external walls being curved in a semi-circular shape to meet at the back of the cap and the two cap external walls abutting the curved end wall of said elongated groove; and indexing means to align the end cap with one of said two end walls of said tie down track.

7. The end cap of claim 6 wherein said track and cap have a matching beveled flange having a beveled upper surface and a horizontal bottom, each said horizontal bottom abutting said floor surface.

8. A process for installing a length of tie down track in a wooden floor which has a floor surface, said process comprising:

routing a straight groove in the floor surface where the tie down track is to be installed, said straight groove having semicircular ends and a straight length;

cutting a length of tie down track equal to the straight length of said straight groove, said length having first and second ends;

inserting an end cap into each of the first and second ends, said end cap having a semicircular end wall which mates with the semicircular ends of said straight groove to provide a track and end cap assembly;

inserting the track and end cap assembly into said straight groove; and securing said track and end cap assembly to the straight groove.

9. The process of claim 8 wherein said securing step includes the insertion of at least one screw through each of said end caps and a plurality of screws through said tie down track.

10. The process of claim 9 wherein said tie down track and said end caps have a beveled flange with an under surface which abuts the floor surface and extends away from said straight groove.

* * * * *